E. F. SIDDONS, DEC'D.
MRS. J. T. FLAHERTY, ADMINISTRATRIX.
ANIMAL TRAP.
APPLICATION FILED JAN. 23, 1912. RENEWED AUG. 20, 1914.
1,130,852.
Patented Mar. 9, 1915.
2 SHEETS—SHEET 1.
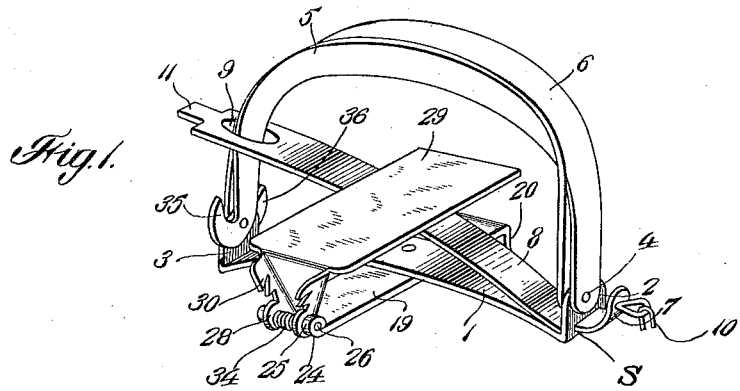
Fig. 1.
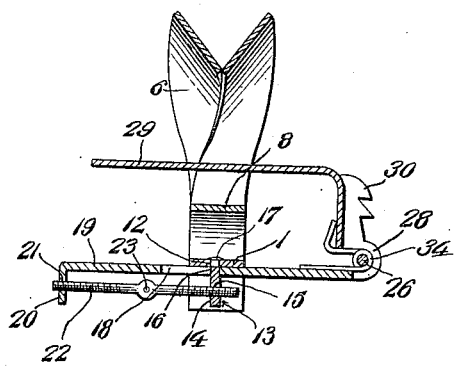
Fig. 2.
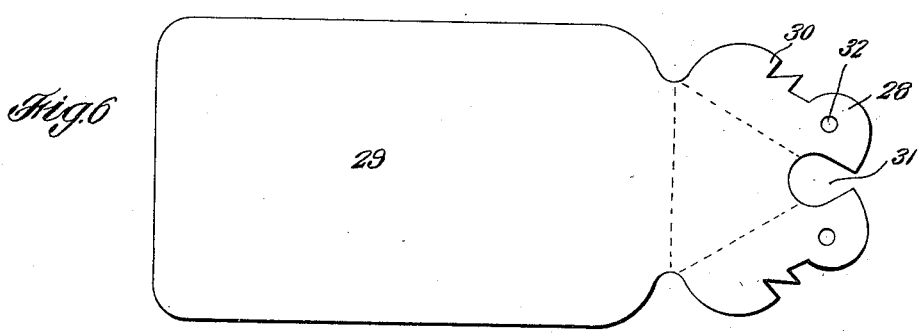
Fig. 6.
Witnesses
J. H. Crawford
W. M. Koerth
Inventor
Enoch F. Siddons,
By Victor J. Evans
Attorney

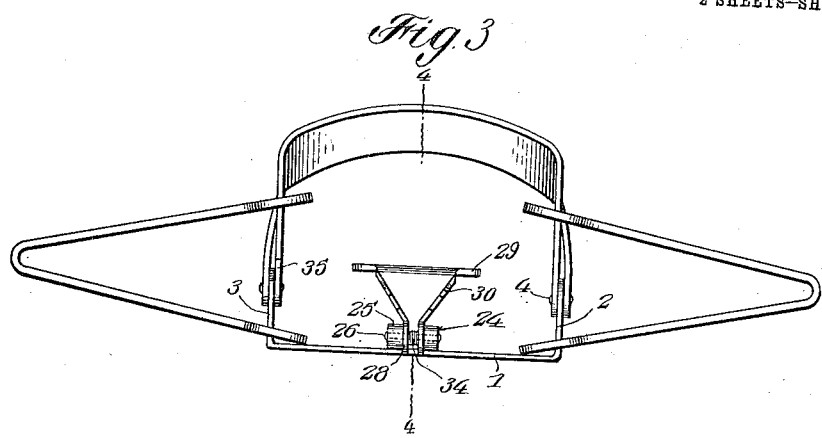
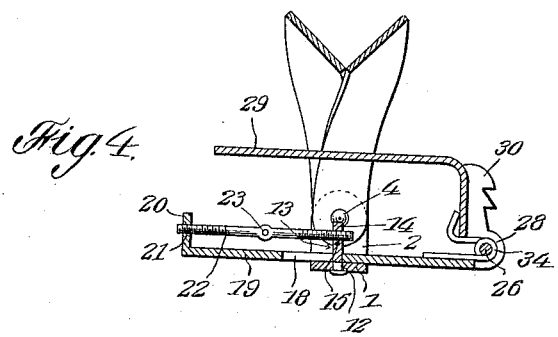
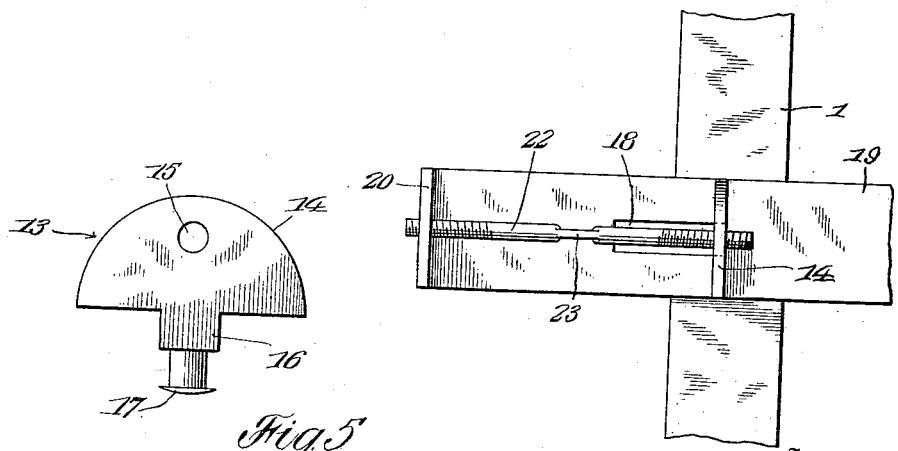

UNITED STATES PATENT OFFICE.

ENOCH F. SIDDONS, OF RED LODGE, MONTANA; MRS. JOHN T. FLAHERTY ADMINISTRATRIX OF SAID SIDDONS, DECEASED.

ANIMAL-TRAP.

1,130,852. Specification of Letters Patent. Patented Mar. 9, 1915.

Application filed January 23, 1912, Serial No. 672,818. Renewed August 20, 1914. Serial No. 857,801.

*To all whom it may concern:*

Be it known that I, ENOCH F. SIDDONS, a citizen of the United States, residing at Red Lodge, in the county of Carbon and State of Montana, have invented new and useful Improvements in Animal-Traps, of which the following is a specification.

This invention relates to certain novel improvements in animal traps.

In carrying out my invention it is my purpose to provide spring traps with jaws and pans of a novel construction which may be set automatically by pressure upon the springs, thus obviating the danger incident to the setting of the ordinary spring trap.

Heretofore it has been absolutely necessary for the trapper to first compress the springs and swing the jaws by hand, manipulate the dog with the fingers of one hand, and lift the pan with the fingers of the other hand until the dog engages with the notch in the pan. The strength and number of springs vary with the different sizes of traps, but all of said springs are adapted to exert a great pressure, hence the operation of setting the traps is extremely dangerous, as the slightest let-up will cause the jaws to spring together, and thus injure the hands of the trapper in his attempt to set the catch. Furthermore, in the general construction of traps, no provision is made against having the trap sprung by birds, mice, etc., attracted to the trap by the bait, which of course renders the trap useless for catching the animal for which it has been set.

It is my object to obviate the above objections by constructing traps in which pressure on the spring will automatically open the jaws, which are provided with adjustable pans having a plurality of integrally formed catches to adapt the traps to the various sizes of animals to be trapped, and to have their jaws of a peculiar and novel construction wherein that part of the animal's leg first grasped will be be held under all conditions. I also aim to provide jaws and pans as described to fit any ordinary trap.

With the above objects, and others of a similar nature in view, the invention resides in the construction, combination and arrangement of parts set forth in and falling within the scope of the appended claims.

In the accompanying drawings,—Figure 1 is a perspective view of a trap constructed in accordance with the present invention, the jaws being in their closed position. Fig. 2 is a longitudinal sectional view taken centrally of the pan. Fig. 3 is a side elevation of my improvement applied to a double spring trap. Fig. 4 is a sectional view on the line 4—4 of Fig. 3. Fig. 5 is an enlarged elevation of the slidable nut member. Fig. 6 is a plan view of the blank from which the pan is formed. Fig. 7 is a detail plan view of a portion of the bar 19 and a portion of the bottom plate 1 illustrating the turning member 22 engaging the upset end of the bar and the sliding nut.

Referring now to the drawings in detail, the numeral 1 designates the bottom plate of the trap. This plate is of the usual formation comprising a rectangular member having both of its ends upset as designated by the numerals 2 and 3. Both of these upset ends are provided with an opening 4, the said openings adapted to receive the pivots whereby the ends of jaws 5 and 6 are connected to the said upset portions 2 and 3. The upset end 2 is provided with a slit or opening *s* at its juncture with the bottom plate, the said slit being adapted to receive the reduced tongue 7 provided upon the flattened spring member 8. The spring member 8 is provided with the usual opening 9 surrounding the jaws and through which the upset end 3 of the bottom plate projects when the trap is set and it is of course understood that the said spring is positioned below the jaws 5 and 6. The tongue 7 of the spring is provided with an opening, the said opening being adapted to receive the chain 10 which retains the trap at a desired location. The spring is curved upwardly a suitable distance from the end provided with the tongue 7, so as to offer sufficient resiliency to close the jaws 4 and 5 when the retaining mechanism, hereinafter described in connection with the pan, has been operated by the said pan. The end of the spring opposite that of the tongue 7 is provided with a reduced extension 11, the said extension serving as a foot or hand lever whereby the spring is pressed in order to set the trap.

The bottom plate 1 is centrally provided with an opening 12, the said opening adapted for the reception of a nut 13. This nut 13 is of a peculiar construction comprising a head 14 which is provided with a threaded opening 15, and with a projecting reduced stem 16, the lower extremity of which being preferably headed as at 17. The stem 16 is rectangular in cross section, whereby the same, when positioned in one direction, may be readily inserted through a rectangular opening 18 provided upon the pan bar 19. The nut when turned to a right angle, after being inserted through the said slot 18, will bear against the pan bar adjacent the said slot. One of the extremities of the pan bar 19 is upset or otherwise provided with a shoulder 20, the said upset portion or shoulder being provided with an opening 21, the said opening having threads which are arranged at an opposite pitch to the threads provided in the member 13 which I have referred to as the nut. These threaded openings are adapted to receive the oppositely threaded ends of a turning rod 22, the same having its middle portion enlarged and provided with an opening 23, the latter being adapted for the reception of a nail or the like, whereby the said bar 22 is rotated so as to bring the upset end 20 of the pan bar 19 either toward or away from the nut 13, the purpose of which will presently be set forth.

One end of the bar 19 is bifurcated, and the arms 24 thus provided are bent upon themselves to form eyes 25, the said eyes receiving a pintle 26, which also passes through openings formed in depending portions 28 provided upon one end of a rectangular flattened pan 29. The pan 29 as illustrated in Fig. 6 of the drawings, is struck from a single piece of metal, the rear portion being bent and each of the end portions having their longitudinal edges cut inwardly and inclined toward each other, the edges of the said inclined portions notched or incut to provide the hooks 30, two or more of which being arranged upon each of the said inclined edges. The extremity of this reduced portion is bifurcated as at 31, and the portions adjacent the said bifurcations are provided with openings 32. The said members are then bent downwardly and toward each other upon the dotted lines illustrated in Fig. 6. When the said ends are thus bent it will be noted that they are arranged at an approximately right angle to the body of the pan, and the extremities provided with the openings 32 are adapted to engage with a pintle 26 which passes through the eyes provided by the bifurcated end of the pan bar. Surrounding the pintle between the ends or ears formed with the openings 32, is a helical spring 34, the latter exerting pressure between the downturned portion of the pan and the pan bar so as to normally force the pan in an upward position or away from the bar 19.

The jaws, 5 and 6, in the present instance, have their pivoted offset portions directly below the opening 9 of the spring formed with arcuate fingers 35 and 36, the same being inclined upwardly at a suitable angle with relation to the spring 8 which they underlie and with which they contact, and by this arrangement it will be noted that upon a compression of the spring 11, the said spring contacting with the fingers 35 and 36 will automatically swing the jaws open so that the jaw 5 will engage with one of the pairs of hooks 30 provided upon the pan 29, thus setting the trap without danger of the trapper placing his fingers between the jaws to arrange the catch for the jaws.

The jaws 5 and 6 have their upper portions arranged substantially parallel with the bottom bar of the trap while their side arms are positioned at a substantially right angle to the upper or connecting portions of the said jaws. The side or pivoted arms are reduced while the upper or grasping portions of the jaws are enlarged and are arranged at a suitable angle one away from the other, so that the said jaws, when in their closed position are substantially V-shaped in cross section. By this peculiar construction of the jaws, the same will effectively grasp the swollen portion of the foot of the animal and retain the said animal under all conditions.

By operating the turning rod the pan bar and pan will be moved transversely of the jaws so that the jaw 5, when swung, may contact with the entire engaging surface of either of the series of hooks, or the said jaw may be brought to engage with only the outer corner or edges of the said hooks, thus requiring a small or a large amount of pressure upon the pan to swing the same and spring the jaws. By providing the pan with two series of hooks, either of which may be engaged by the jaw 5, it will be noted that both the springs 8 and 34 will be compressed to a required degree to permit of the springs operating the pan and jaws in accordance with the weight deposited upon the pan, as for instance, should the jaw 5 be brought into engagement with the upper series of hooks 30, the springs will be only slightly compressed, and when the jaw is brought into engagement with the lower series of hooks 30, the springs are further compressed so that a heavier weight will be deposited upon the pan to spring the jaws than the weight required for springing the jaws when the said jaw 5 engages with the upper series of hooks 30.

From the above description, taken in connection with the accompanying drawings, the simplicity of the structure, as well as the many advantages thereof will, it is thought be perfectly apparent to those skilled in the art to which such inventions appertain without further detailed description, it being understood that the jaws, pan, and adjustable pan bar may be applied to any ordinary make of traps either separately or connectively.

Having thus described the invention what I claim is:—

1. In a trap of the class described, spring pressed jaws, a pan having its end provided with hooks adapted to be engaged by one of the jaws, and means for adjusting the pan to permit any of its series of hooks being engaged by the said jaw to regulate the tension of the spring of the jaws.

2. In a trap of the class described, spring pressed jaws, a pan having its end provided with hooks and adapted to be engaged by one of the jaws, and means comprising a turning rod for adjusting the pan to permit any of its series of hooks being partly or wholly engaged by the said jaw, substantially as and for the purpose set forth.

3. In a trap of the class described, a base plate, spring pressed jaws pivotally secured to the base plate, a pan having one of its ends provided with a series of hooks, a pan bar pivotally connected with the hooked end of the pan, a spring between the bar and pan, said bar having an elongated opening, a nut secured to the base plate and passing through the opening, the free end of the pan bar having a downturned shoulder provided with a threaded opening, and an oppositely threaded turning rod engaging within the threaded opening and within the bore of the nut, all substantially as and for the purpose set forth.

In testimony whereof I affix my signature in presence of two witnesses.

ENOCH F. SIDDONS.

Witnesses:
E. A. LOGAN,
D. G. O'SHEA.

Copies of this patent may be obtained for five cents each, by addressing the "Commissioner of Patents, Washington, D. C."